United States Patent [19]

Dugge et al.

[11] 3,958,722

[45] May 25, 1976

[54] SELF INDEXING ELBOW

[75] Inventors: Richard H. Dugge, St. Louis; Dallas W. Rollins, St. Charles, both of Mo.

[73] Assignee: ACF Industries, Incorporated, New York, N.Y.

[22] Filed: Nov. 20, 1974

[21] Appl. No.: 525,492

[52] U.S. Cl.............................. 222/195; 302/56; 259/151; 259/22; 285/158; 308/8
[51] Int. Cl.²................................................. B65G 3/12
[58] Field of Search............ 222/193, 195; 302/56, 302/57; 259/21–24, DIG. 17, DIG. 16, 151; 285/276, 272, 192, 158; 137/525; 308/8, 22, 36, 37

[56] References Cited
UNITED STATES PATENTS

| 806,214 | 12/1905 | Trent | 259/151 |
|---|---|---|---|
| 1,137,294 | 4/1915 | Schroder | 259/151 |
| 1,275,922 | 8/1918 | Holt | 285/192 |
| 2,025,404 | 12/1935 | Stahn | 222/195 |
| 2,731,296 | 1/1956 | Griffith | 239/261 |
| 2,905,200 | 9/1959 | Guiet et al. | 138/26 |
| 3,000,036 | 9/1961 | DeBenedetti | 239/264 |
| 3,366,282 | 1/1968 | Lucas | 222/195 |
| 3,519,012 | 7/1970 | Van Patten | 137/525 |
| 3,767,169 | 10/1973 | Carpigani | 259/DIG. 16 |
| 3,774,889 | 11/1923 | Guary | 259/DIG. 16 |

*Primary Examiner*—Drayton E. Hoffman
*Assistant Examiner*—H. Grant Skaggs
*Attorney, Agent, or Firm*—Henry W. Cummings

[57] ABSTRACT

Apparatus is disclosed for assisting in the unloading of a difficult to unload lading from a vessel. An accumulator is mounted adjacent the vessel. A first conduit connects the accumulator with a valve for periodic discharge of the accumulator. A self-indexing elbow is rotatably mounted on the vessel and extends within the vessel. A second conduit connects the valve with the elbow. The elbow includes an elbow conduit portion in fluid communication with the second conduit. The elbow conduit portion has a center line defining an axis about which the elbow is rotatable. The elbow also includes an elbow portion having an elbow center line passing therethrough. The elbow portion has a discharge end having a discharge opening through which the elbow center line passes. At the discharge end the elbow center line is offset with respect to the axis so as to define a moment arm between the elbow portion and the axis. The accumulator is pressurized with gas sufficient to dislodge bridged or clogged lading in the vessel and sufficient to cause said elbow to rotate relative to the axis. A bearing assembly is mounted between the elbow conduit portion and the vessel, having a frictional force sufficient to limit rotation of said elbow with respect to the vessel, such that rotation ceases at a new angular position relative to the axis prior to the next discharge of pressurized gas from the accumulator. The elbow may be attached so that the frictional force can be adjusted to vary the extent of elbow rotation after each blast of gas is discharged from the elbow. A check valve may be applied to the discharge end of the elbow to prevent lading from entering the elbow. Lading clearing openings in addition to the discharge opening may be provided in the elbow portion to facilitate removal of lading or other material which may tend to hold the elbow in place and prevent the same from rotating as a blast of gas is discharged from the discharge opening.

21 Claims, 11 Drawing Figures

SELF INDEXING ELBOW

BACKGROUND OF THE INVENTION AND OBJECTS

This invention pertains to an apparatus for facilitating the discharge of lading through an oulet in a vessel. By the term vessel is meant to include industrial bins, hoppers, railway hopper cars, transportation containers, ships, or other structures containing particulate lading to be discharged therefrom through an opening therein.

A frequent problem which has received the attention of prior practitioners in this art is the "bridging" which occurs at the discharge outlet of a vessel. The particulate material builds up across the outlet to create a blockage which prevents the further discharge of material.

Various approaches have been used to prevent bridging. One such approach is to shape the outlet portion of the vessel in a manner which will facilitate flow of the particulate solids. Another solution involves the vibration of the vessel which induces enough agitation to deter stoppage of the outlet flow. Still another approach is the provision of a vibrating or oscillating member at the outlet as shown by U.S. Pat. No. 767,591 which issued on Aug. 16, 1904, to William E. Nickerson. A wide variety of vibrators and oscillators are now available for attachment to the outlet and/or the vessel.

In Holm U.S. Pat. No. 3,637,115 sound vibrations are utilized to facilitate sliding of particulate material down a hopper.

In Cymbalisty U.S. Pat. No. 3,407,927 a member or obstruction is provided adjacent the outlet of the vessel containing the particulate material. This member is vibrated at a frequency in the range of 5000–12000 cycles per minute along the central axis of the outlet. Simultaneously, it is vibrated at a lower frequency in directions transverse to the outlet. This latter frequency is preferably in the range of 400 to 1000 cycles per minute. The transverse vibrations, since they are of a lesser frequency, do not appreciably densify the mass of particulate matter, but they do continuously compact and release the mass against the walls of the outlet to facilitate discharge of the material.

However, none of these techniques have been effective in preventing bridging during lading discharge. In fact, bridging is such a serious problem that some lading simply cannot be unloaded from vessels because of the bridging problem. Example of such lading are asbestos and wood flour.

Furthermore, vibrators and oscillators apply considerable stresses to the hopper, particularly fatigue, and failures due to continuous vibration during unloading are not uncommon.

In Matson U.S. Pat. No. 3,788,527 there is provided a quick release aerator that stores a large volume of air under significant pressure and then releases the air into the storage vessel, producing a blast which dislodges stuck or bridged lading.

In the Matson arrangement an accumulator for storing compressed air has mounted within it a valve used to release the air and direct it into the vessel through an air discharge conduit.

While this arrangement is effective is dislodging lading in the general path of the air discharge conduit, it is not effective to dislodge lading which is not in the path of the discharge conduit.

Thus in order to dislodge all the lading in a hopper or vessel in accordance with the Matson arrangement, it is necessary to mount a plurality of aerators in such a manner that the air discharge conduits extend generally into all parts of the vessel. Thus a large number of aerators are required per vessel to dislodge and unload the lading.

SUMMARY OF THE INVENTION

One object of the present invention is to provide an arrangement whereby the number of aerators per vessel may be reduced.

Another object of the present invention is to provide a structure whereby gas blast from an accumulator may be directed through a large area or volume of the vessel adjacent the end of the gas discharge conduit.

In accordance with the present invention apparatus for assisting in the unloading of a difficult to unload lading from a vessel is provided including an accumulator mounted adjacent the vessel. A first conduit connects the accumulator with valve means for periodic discharge of said accumulator. A self-indexing elbow is rotatably mounted on the vessel and extends within the vessel. A second conduit connects the vale means with the elbow. The elbow includes and elbow conduit portion in fluid communication with the second conduit, having a conduit center line defining an axis about which said elbow is rotatable. Integral with the elbow conduit portion is an elbow portion having an elbow center line passing therethrough. The elbow center line and the axis intersect making an angle therebetween within the range of about 45° and 135°. The axis and the elbow center line define near their junction an elbow plane. The elbow portion has a discharge end having a discharge opening therein through which the elbow center line passes, at the discharge end, making an angle with respect to the elbow plane. The elbow center line is offset with respect to the axis at the discharge end so as to define a moment arm between the elbow portion and the axis. Means are provided for pressurizing the accumulator with gas sufficient to dislodge bridged or clogged lading in the vessel, and sufficient to cause said elbow to rotate relative to the axis. A bearing assembly is mounted between the elbow conduit portion and at least one of said vessel and said second conduit. The bearing assembly has a frictional force sufficient to limit rotation of said elbow with respect to said vessel. A release of pressurized gas by the valve means from said accumulator will cause the gas to pass through the second conduit into the elbow and discharge from the discharge opening into the vessel with a thrust sufficient to cause said elbow to rotate with respect to said axis. The frictional force in the bearing assembly is sufficient to cause the rotation to cease at a new angular position relative to the axis prior to the next discharge of pressurized gas from the accumulator. A check valve may be applied to the discharge opening of the elbow. Means may be provided to vary the frictional force in the bearings to very the extend of rotation of the elbow after a blast of gas is discharged therefrom. Lading clearing openings may be provided in the elbow to facilitate removal of lading or other material which may tend to hold the elbow in place and prevent the same from rotating as a blast of gas is discharged therefrom.

DETAILED DESCRIPTION

To provide the necessary thrust of compressed gas, a source of compressed air or other gas which will not react with, or deleteriously effect the lading is provided on, or adjacent to, the vessel containing the particulate lading. Means are also provided for timed release or discharge of the compressed gas. One such means is a quick release valve mounted in operative relationship with the source of compressed gas.

In the embodiment illustrated an accumulator 10 extends longitudinally below two vessels 12. The vessels have sloping sides 13 and an outlet 11 of conventional construction. The invention is in no way limited to the type of outlet utilized. For example, the outlet may be gravity, pneumatic, a combination gravity-pneumatic. The lading may discharge through openings other than at the bottom of the vessel, such as but not limited to, discharge through hatches in the roof of the vessel.

Discharge valves 14 are provided for the pressurizing of accumulator 10, and for the discharge of compressed gas from accumulator 10. Appropriate conduits first 16 are provided between accumulator and the valves, each having respective flanges 15 and 17, or other appropriate means to provide attachment between valve members 14 and the conduits 16.

Figure 5:
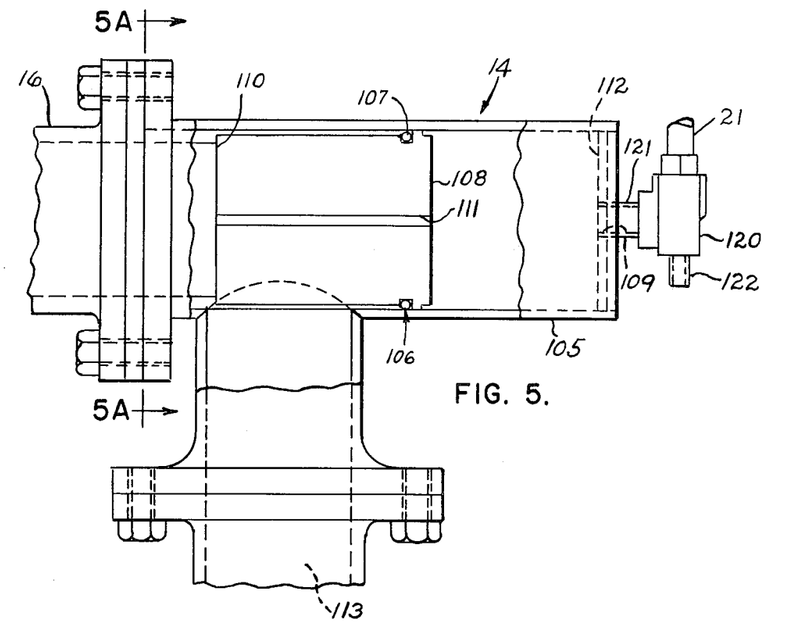
FIG. 5 is a detail view of a valve which may be used to pressurize the accumulator and which may provide a timed release or discharge of compressed gas.
Figure 5A:
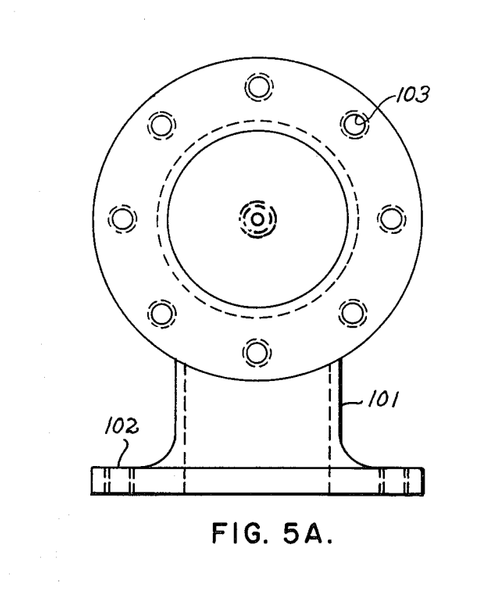
FIG. 5A is an end view of the valve shown in FIG. 5 illustrating the support and mounting plate for the valve.

A source of compressed air 20 is provided, for example, shop air supplied to a hose 21, is affixed to the valve 14 with appropriate connections 22 which is utilized to pressurize the accumulator 10. As shown in FIGS. 5 and 5A valve 14 is provided with a base or support 101 having a flange 102 and bolt openings 103 adapted for mounting the valve in place. Compressed air is supplied from hose 21 through port 109 into cylinder 105 forcing piston 108 against seat 110. A recess 106 is provided in piston 108 into which is placed a sealing member such as O-ring 107. Compressed air flows through port 111 in cylinder 105, thereby charging tank 10 to desired pressure. A quick release control valve 120 connected to cylinder 105 with conduit 121 is actuated to cause a reduction in pressure at port 109. Then the pressure in tank 10 causes piston 108 to rapidly move back against surface 112 allowing gas very rapidly to escape out port 113.

Valve 120 may be automatically actuated by remote control, for example, by means of a solenoid. Valve 120 may also be provided with a muffler 122 to reduce the noise level of exhausting gas through valve 120.

Figures 3, 4, 6:
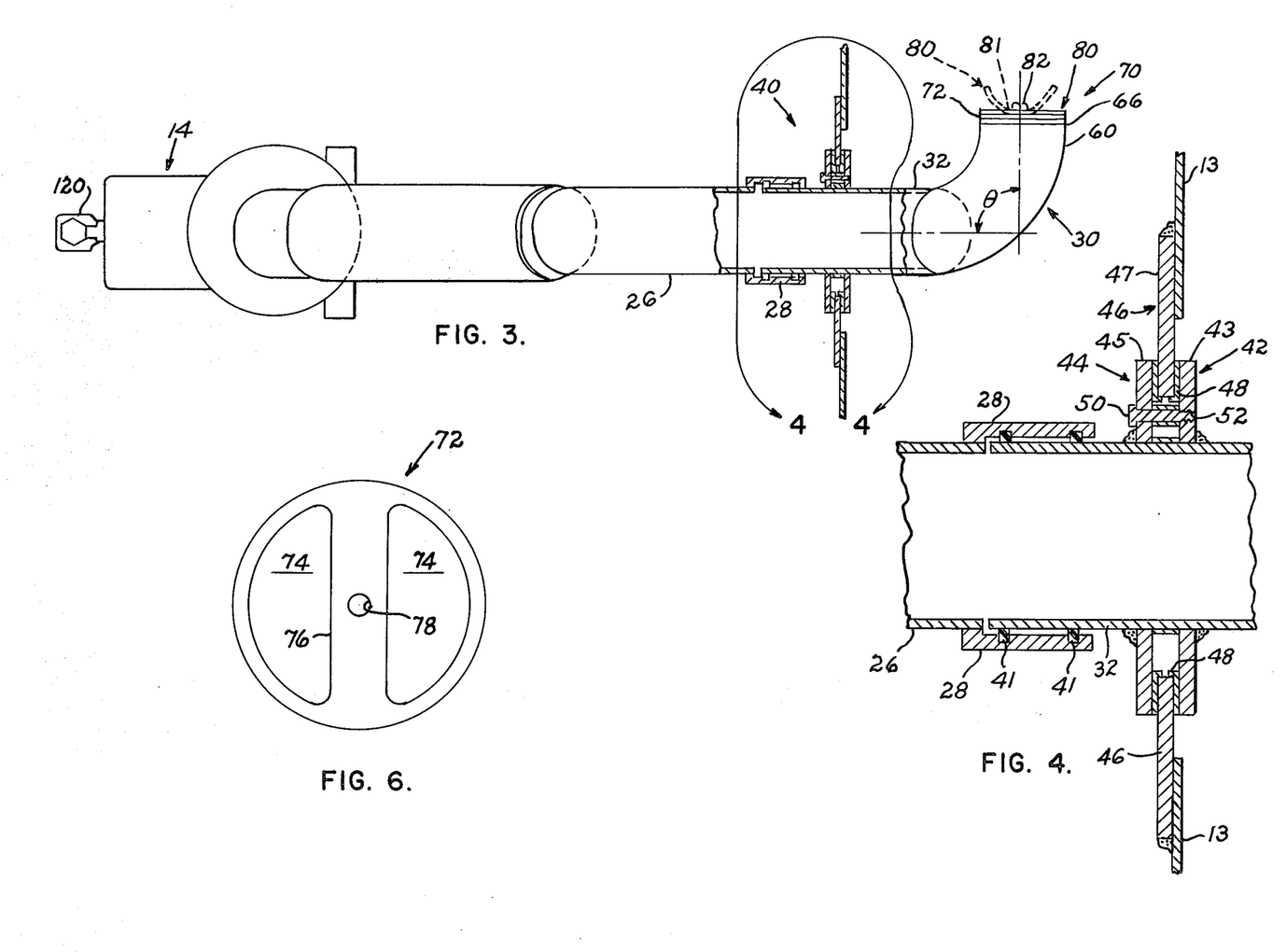
FIG. 3 is a view along the lines 3—3 in FIG. 2.
FIG. 4 is an enlarged sectional view along the lines 4—4 of FIG. 3 illustrating a portion of the bearing structure to be utilized for the elbows of the present invention.
FIG. 6 is a detail view of the check valve plate.

A second conduit 26 extends from the valve 14. Support brackets 27 and a support plate 27a held in place with fasteners 27b may be provided. Conduit 26 as shown in FIG. 4 is provided with an expanded section 28.

The elbow of the present invention indicated generally at 30 has a conduit portion 32 which is concentric with the expanded section 28. Elbow 30 is provided with a bearing assembly indicated generally at 40. One or more bearing members 41 FIG. 4 which are preferably made of a low friction bearing material, for example, fluorinated polyethylene, (i.e. nylon, teflon and polyvinyl chloride) are provided between the concentric members 28 and 32.

When low friction bearing materials are used for bearings 41 the amount of friction between concentric extension 28 and conduit portion 32 is very small and may be considered negligible.

Bearing assembly 40 further comprises a movable portion 42, for example a plate 43, which is welded or otherwise affixed to conduit 32 and a second movable member 44 is provided in generally parallel relation to the plate 43. Extending in operative relation to movable portion 42, in this case between members 42 and 44 is a fixed member 46, for example a plate 47, which is welded or otherwise affixed to the vessel. A bearing member 48 is provided between members 42 and 44 which engages plate 46, and on opposite sides, members 42 and 44. A plurality of fasteners 50 are provided which pass through plate 44 and in one embodiment are threaded into threads 52 in plate 43. Thus the friction between plates 43 and 45 against fixed plate 47 can be varied by the extent to which fasteners 50 are tightened into threads 52. Non threaded fasteners, such as huck bolts and rivets, could also be used to vary the force applied between plates 42 and 44.

Self indexing elbow 30 of the present invention is provided with an elbow portion 60 which is integral with conduit portion 32. Elbow 60 makes an angle (FIG. 3) of 45° to 135° with respect to conduit portion 32, preferably about 75 to 110 degrees. Elbow 60 may be made of the same piece of tubing as member 32 or may be integrally affixed thereto by welding or with fasteners, as desired. Elbow portion 60 is also provided with a discharge end 66.

Figure 1:
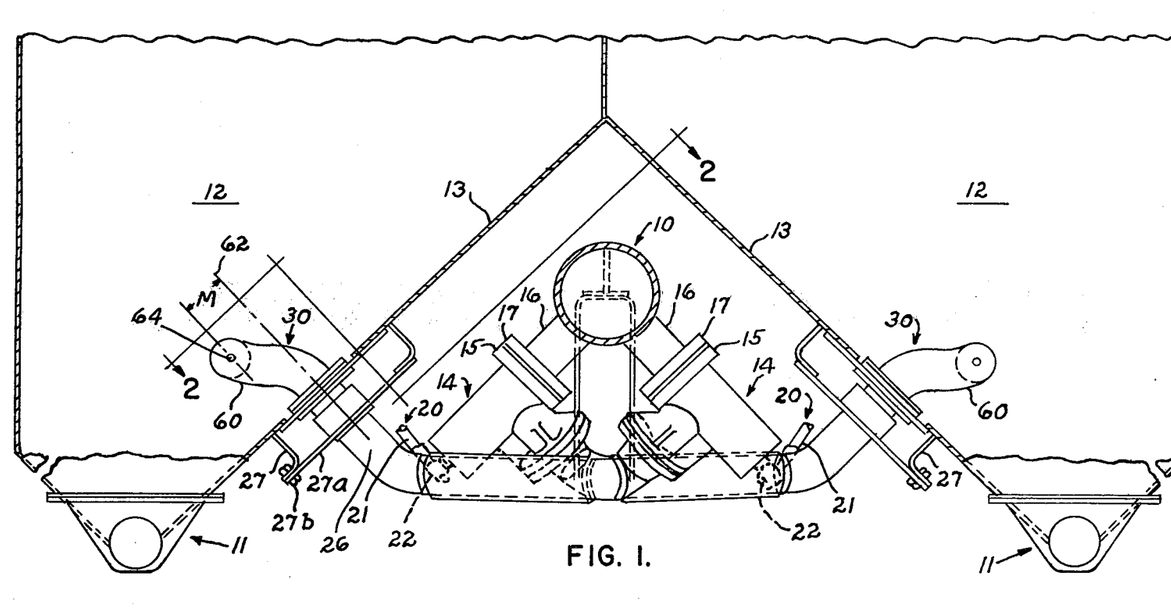
FIG. 1 is a side elevational view of a pair of vessels having an accumulator mounted thereunder and having the self indexing elbows of the present invention affixed to each of the vessels.
Figure 2:
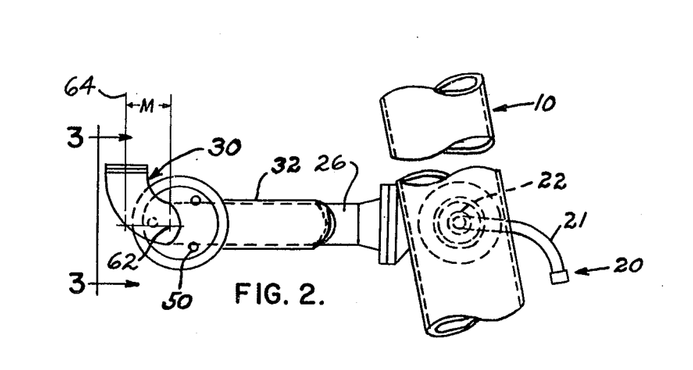
FIG. 2 is an elevational view along the lines 2—2 in FIG. 1 with the hopper slope sheet removed for clarity.

Conduit portion 32 is provided with a center line of rotation illustrated in FIG. 1 at 62 and elbow portion 60 has a center line indicated at 64 which intersects the conduit center line of rotation 62 defining an elbow plane in the vicinity of their junction. Elbow center line 64 passes through discharge end 66, and at the discharge end makes an angle with respect to the elbow plane. A moment arm M is defined between the center line 64 at the discharge end 66, and the center line 62 of the conduit portion (FIGS. 1 and 2).

In accordance with one embodiment of the present invention it is preferred to provided a check valve assembly 70 at the discharge end 66 of the elbow. The check valve assembly 70 allows air or other compressed gas to pass out of discharge portion 66 but does not allow lading to pass back into the elbow and clog or otherwise harm the self indexing valve of the present invention, the accumulator valve, and/or the accumulator. Check valves are known in the art per se and the check valve construction to be utilized is not critical. However, in accordance with one construction which may be utilized, a check valve plate 72 (FIG. 6) is mounted upon discharge opening 66. Plate 72 has openings therein 74 for gas discharge. A center rib 76 is provided having an opening therein 78. An elastomeric member 80 having a center opening therein 81 is mounted on plate 72 by means of a fastener 82 as shown in FIG. 3. During gas discharge the elastomeric member 80 moves outwardly as shown dotted in FIG. 3 and allows the gas to pass outwardly, and immediately upon the end of exiting gas the elastomeric member snaps back into place under the bias of fastener 82.

In the operation of the self indexing elbow of the present invention, valve member 14 releases a blast of compressed air or other gas from accumulator 10. This blast of gas rapidly passes through conduits 26 and 32 and discharges from elbow end portion 66. In so discharging an equal and opposite force or thrust is applied to the self indexing elbow along center line 64 and causes the elbow to rotate about center line 62 with respect to fixed plate 46 and concentrically within the enlarged conduit portion 28. The duration of rotation is usually for not more than several seconds. In general will be for not more than about 90°, preferably about 30° to 60°, although for some applications it may be desirable to utilize greater rotation, even as much as several complete revolutions (b 360° per revolution).

When valve 14 releases another blast from accumulator 10 the self indexing elbow discharges another blast from discharge end 66 and rotates additional degrees. It will be apparent that after a number of discharges the self indexing elbow will apply blasts throughout a 360° arc in FIG. 2 and will apply these blasts through a wide area within vessel 12. Thus the self indexing elbow of the present invention is very effective in breaking up bridged lading in a wide area or volume of hopper 12. The elbow is particularly effective in dislodging bridged or difficult to unload ladings, such as asbestos and wood flour.

For a given thrust from accumulator 10 or other source of compressed gas the extent that elbow 30 will rotate for a given blast can be varied by the amount of friction applied by friction assembly 40. The tighter fasteners 50 are applied to plates 42 and 44 the less the elbow will rotate, and vice versa.

Another variable is the extent to which accumulator 10 is pressurized. For a given friction force applied by friction assembly 40, the higher accumulator 10 is pressurized, the greater the force or thrust emitting from valve 14 and the greater will be the amount of rotation of elbow 30. Lower accumulator force or thrust pressure will result in less rotation of elbow 30.

Greater rotation can also be obtained in increasing the length of the moment arm M, and less rotation obtained by reducing the moment arm.

By way of example, it has been found that for many vessels the normal force upon the sides 13 is from about 1 to 20 psi. In order to effectively unload particulate material which tends to bridge or otherwise bind together (in some instances due to moisture in the lading), it has been found that a moment M of from about 50 to about 3500 foot pounds is desirable.

Accumulators capable of providing a thrust of from about 750 to 3000 pounds of thrust at discharge end 66 may effectively be utilized in such a system. The volume of the accumulator may vary widely, for example, from as low as about 0.1 ft.$^3$ to as high as 1000 ft.$^3$. Discharge volumes below about 0.1 ft.$^3$ do not provide sufficient rotation of the elbow. As the volume increases, the cost of the accumulator increases. Thus volumes above about 100 ft.$^3$ are less preferred because of cost. The larger the volume of the accumulator, the longer it takes to pressurize it for a given gas pressure (for example, shop air which is usually from about 90 to 100 psi). However, the greater the volume discharged from the accumulator, the greater will be the rotation of the elbow and the longer the elbow will rotate.

The moment arm M about the axis 62 is preferably from 1 to about 15 inches, and is most preferably not more than about 10 inches.

The foregoing numbers are not to be considered fixed but rather as examples of generally operable conditions which may be utilized in the operation of the self indexing elbow of the present invention.

It will be apparent that the self indexing elbow of the present invention can be mounted in operative relation to the vessel in a variety of manners. In accordance with one alternative mounting structure shown in FIG. 7, a bearing assembly 140 is integrally affixed, for example, by welding to conduit 26. Bearing assembly 140 comprises an outer fixed member 142 (cylinder 143) integrally affixed, for example, by welding to vessel side sheets 13. Bearings 144, for example, roller bearings or ball bearings 146, are provided between fixed member 142 and movable member (inner cylinder 148). Conduit portion 32 of the self indexing elbow is then integrally affixed to inner cylinder 148, for example, by press fit.

Figure 7:
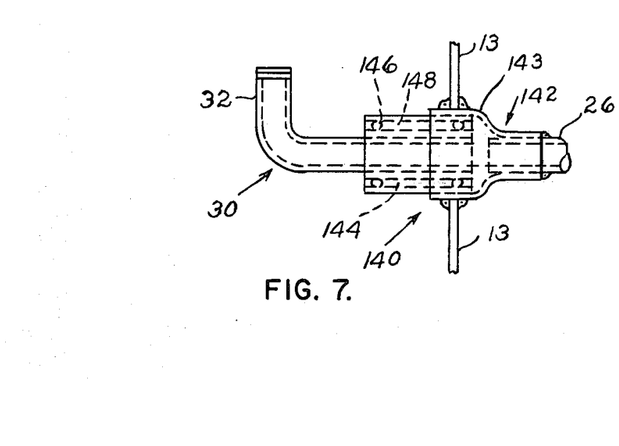
FIG. 7 is a cross-sectional view of one alternative arrangement for mounting the self indexing elbow of the present invention in operative relation to a vessel.

In accordance with this embodiment the amount of friction between the fixed and movable portions of the bearing assembly can be varied to some extent by the number and size of the bearings 144, for the example the number and diameter ball bearings 146.

One advantage of this embodiment is that a separate bearing assembly for mounting the elbow in operative relation to the vessel and a second bearing assembly for varying the friction between the fixed and movable portions of the bearing assembly is not required. In this embodiment one bearing assembly 140 is all that is required.

Figure 8:
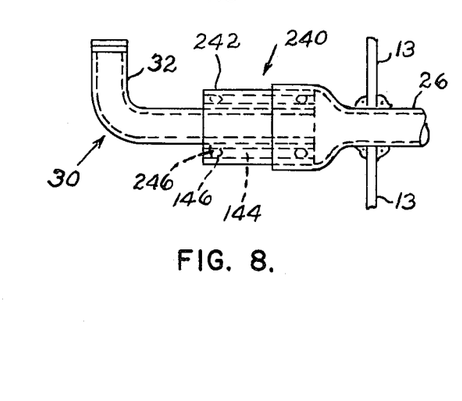
FIG. 8 is a cross-sectional view of another arrangement for mounting the self indexing elbow of the present invention in operative relation to a vessel.

In still another mounting arrangement shown in FIG. 8, conduit 26 extends through the opening in the vessel, and a bearings assembly 240 is mounted inside the vessel on conduit 26 (rather than on the vessel). Bearing assembly 240 is similar to assembly 140 in FIG. 7, comprising a fixed outer cylinder 242 and a movable inner cylinder 246, between which is placed bearings 144, for example, ball bearings 146. The friction can be varied by varying the number and size of bearings 144.

Figure 9:
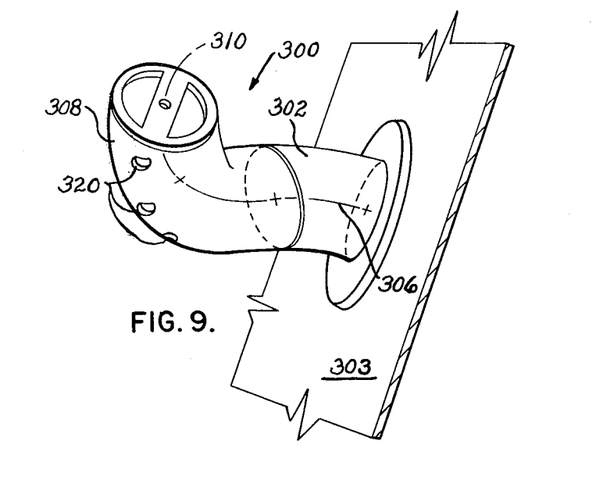
FIG. 9 is an axonometric view of a self indexing elbow of the present invention with the check valve removed having openings therein to facilitate removal of lading which may prevent the elbow from rotating.
Figure 10:
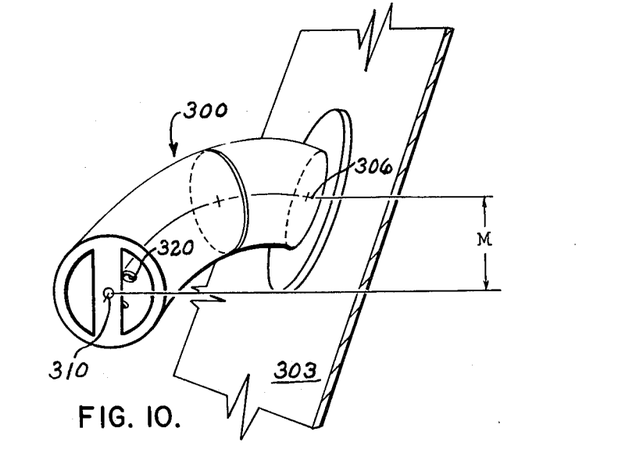
FIG. 10 is a 120° rotated view of FIG. 9.

In accordance with another embodiment of the present invention shown in FIGS. 9 and 10, the self indexing elbow is indicated generally at 300. This self indexing elbow is provided with a conduit portion 302 mounted for rotation with respect to a vessel 303. Conduit portion 302 is provided with a conduit center line 306. Elbow 300 is also provided with a discharge elbow portion 308 having an elbow discharge center line 310. Thus a thrust of gas discharging from discharge elbow 310 results in a moment arm M about the conduit center line 306 and resulting in rotation of the elbow.

However, when some ladings are introduced into a vessel in which the self indexing elbow is in place, if these ladings happen to become tightly packed about the self indexing elbow, and the lading becomes bridged or clogged around the elbow, even when a discharge of gas occurs through discharge elbow portion 308, the self indexing elbow will not rotate, because there is too much clogged or bridged lading in the path of the elbow which prevents rotation of the elbow.

In accordance with one embodiment of the present invention, this problem is overcome by placing one or more lading clearing openings 320 on the side of the elbow in the direction of intended rotation. Thus, as shown in FIG. 10, since clockwise rotation would result from a discharge from elbow portion 308, openings 320 are placed on the under side of the elbow. If counterclockwise rotation were designed into the elbow, the openings would be placed on the opposite side. With such openings in place, part of the blast from the accumulator after passing through the discharge valve will exit through openings 320 and clear away some of the material in the path of the elbow so that it can begin rotating. Thus, the gas exiting from the openings 320 clears some or all of the lading from the path of the elbow so that the elbow can rotate.

The number of openings for this purpose may vary as desired. However, the number of openings should not be so many or the total opening cross section should not be so great as more gas exits through these openings rather than through the discharge end of the elbow. It will be apparent that these openings result in a component of reaction force opposite to the reaction force from the gas discharging through the elbow discharge opening. Thus the cross-sectional area of the discharge conduit opening must exceed the cross-sectional area of the lading clearing openings or the elbow will not rotate as desired.

What is claimed is:

1. Apparatus for assisting in the unloading of a difficult to unload lading comprising: a vessel adapted to contain said lading; an accumulator mounted adjacent said vessel; a first conduit connecting said accumulator with valve means for periodic discharge of said accumulator; a self-indexing elbow mounted on said vessel; a second conduit connecting said valve means with said elbow; said elbow comprising an elbow conduit portion in fluid communication with said second conduit; said elbow conduit portion being rotatably mounted in operative relation to the vessel and extending within the vessel and having a conduit center line defining an axis about which said elbow is rotatable; said elbow conduit portion having integral therewith an elbow portion having an elbow center line passing therethrough; said elbow center line intersecting said axis and making an angle therebetween within the range of about 45 and 135°; said axis and said elbow center line adjacent their intersection defining an elbow center line adjacent their intersection defining an elbow plane; said elbow portion having a discharge end having a discharge opening therein through which said elbow center line passes; said elbow center line at said discharge end making an angle with respect to said plane, and being offset with respect to said axis so as to define a moment arm between the elbow portion and said axis; means for pressurizing said accumulator with gas sufficient to dislodge bridged or clogged lading in the vessel and sufficient to cause said elbow to rotate relative to said axis; a bearing assembly mounted between said elbow conduit portion and at least one of said vessel and said second conduit, said bearing assembly having a frictional force sufficient to limit rotation of said elbow with respect to said vessel, whereby a release of pressurized gas by said valve means from said accumulator will cause said gas to pass through said second conduit into said elbow and discharge from said discharge opening into said vessel with a thrust sufficient to cause said elbow to rotate with resepct to said axis, the frictional force in said bearing assembly being sufficient to cause the rotation to cease at a new angular position relative to said axis prior to the next discharge of pressurized gas from said accumulator.

2. Apparatus according to claim 1 wherein said bearing assembly comprises a fixed member integral with said vessel and a movable member integral with said conduit portion and frictionally engaging said fixed member.

3. Apparatus according to claim 2 wherein said fixed member and said movable member respectively comprise spaced cylinders and wherein a bearing is provided therebetween.

4. Apparatus according to claim 2 wherein a second movable member is provided and at least one bearing is provided which engages at least one of said first and second movable members and said fixed member.

5. Apparatus according to claim 4 wherein said conduit portion is provided with at least one low friction bearing which concentrically engages a fixed portion of said second conduit supplying said blast of gas.

6. Apparatus according to claim 1 wherein said self indexing elbow further comprises check valve means for substantially preventing lading from entering said self indexing elbow after discharge of gas from said self indexing elbow.

7. Apparatus according to claim 6 wherein said check valve comprises a fixed plate having at least one opening therein mounted on said discharge end and an elastomeric member affixed to said fixed plate closing said opening in closed position to prevent lading from entering into said self indexing elbow and allowing gases to pass therethrough in open position.

8. Apparatus according to claim 1 wherein the angle between said elbow center line and said conduit axis is from 75° to 110°.

9. Apparatus according to claim 1 wherein the moment arm is from about 1 to about 15 inches.

10. Apparatus according to claim 9 wherein the moment is from about 50 to about 3500 foot pounds.

11. Apparatus according to claim 9 wherein the moment arm is not more than about 10 inches.

12. Apparatus for assisting in the unloading of a difficult to unload lading comprising: a vessel adapted to contain said lading; an accumulator mounted adjacent said vessel; a first conduit connecting said accumulator with valve means for periodic discharge of said accumulator; a self-indexing elbow mounted on said vessel; a second conduit connecting said valve means with said elbow; said elbow comprising an elbow conduit portion in fluid communication with said second conduit; said elbow conduit portion being rotatably mounted in operative relation to the vessel and extending within the vessel and having a conduit center line defining an axis about which said elbow is rotatable; said elbow conduit portion having integral therewith an elbow portion having an elbow center line passing therethrough; said elbow center line intersecting said axis and making an angle therebetween within the range of about 45° and 135°; said axis and said elbow center line adjacent their intersection defining an elbow plane; said elbow portion having a discharge end having a discharge opening therein through which said elbow center line passes; said elbow center line at said discharge end making an angle with respect to said plane, and being offset with respect to said axis so as to define a moment arm between the elbow portion and said axis; means for pressurizing said accumulator with gas sufficient to dislodge bridged or clogged lading in the vessel and sufficient to cause said elbow to rotate relative to said axis; a bearing assembly mounted between said elbow conduit portion and at least one of said vessel and said second conduit, said bearing assembly having a frictional force sufficient to limit rotation of said elbow with respect to said vessel; said bearing assembly including means for varying said frictional force and the extent of rotation of said elbow whereby a release of pressurized gas by said valve means from said accumulator will cause said gas to pass through said second conduit into said elbow and discharge from said discharge opening into said vessel with a thrust sufficient to cause said elbow to rotate with respect to said axis, the frictional force in said bearing assembly being sufficient to cause the rotation to cease at a new angular position relative to said axis prior to the next discharge of pressurized gas from said accumulator, and whereby the extent that said elbow rotates relative to said axis when a blast of gas is discharged therefrom may be varied by said means for varying the frictional force in said bearing assembly.

13. Apparatus according to claim 12 wherein said bearing assembly comprises a fixed member integral with said vessel and a movable member integral with said conduit portion and frictionally engaging said fixed member.

14. Apparatus according to claim 13 wherein a second movable member is provided and at least one bearing is provided which engages at least one of said first and second movable members and said fixed member.

15. Apparatus according to claim 14 wherein a fastener engages said movable member and whereby the extent of such engagement may be varied to vary the frictional force between said fixed and movable members.

16. Apparatus according to claim 15 wherein said fixed and movable members are plates.

17. Apparatus according to claim 13 wherein said fixed member and said movable member respectively comprise spaced cylinders and wherein a bearing is provided therebetween.

18. Apparatus according to claim 12 wherein said elbow ceases rotation after not more than about 90° after a blast of gas has discharged therefrom.

19. Apparatus according to claim 12 wherein said elbow rotates for about 30° to 60° after a blast of gas has discharged therefrom.

20. Apparatus for assisting in the unloading of a difficult to unload lading comprising: a vessel adapted to contain said lading; an accumulator mounted adjacent said vessel; a first conduit connecting said accumulator with valve means for periodic discharge of said accumulator; a self-indexing elbow mounted on said vessel; a second conduit connecting said valve means with said elbow; said elbow comprising an elbow conduit portion in fluid communication with said second conduit; said elbow conduit portion being rotatably mounted in operative relation to the vessel and extending within the vessel and having a conduit center line defining an axis about which said elbow is rotatable; said elbow conduit portion having integral therewith an elbow portion having an elbow center line passing therethrough; said elbow center line intersecting said axis and making an angle therebetween within the range of about 45° and 135°; said axis and said elbow center line adjacent their intersection defining an elbow plane; said elbow portion having a discharge end having a discharge opening therein through which said elbow center line passes; said elbow center line at said discharge end making an angle with respect to said plane, and being offset with respect to said axis so as to define a moment arm between the elbow portion and said axis; said elbow portion comprising a tubular conduit having at least one lading clearing opening therein effective to discharge gas in the path of rotation of said elbow; means for pressurizing said accumulator with gas sufficient to dislodge bridged or clogged lading in the vessel and sufficient to cause said elbow to rotate relative to said axis; a bearing assembly mounted between said elbow conduit portion and at least one of said vessel and said second conduit, said bearing assembly having a frictional force sufficient to limit rotation of said elbow with respect to said vessel, whereby a release of pressurized gas by said valve means from said accumulator will cause said gas to pass through said second conduit into said elbow and discharge from said discharge opening with a thrust sufficient to cause said elbow to rotate with respect to said axis, the frictional force in said bearing assembly being sufficient to cause the rotation to cease at a new angular position relative to said axis prior to the next discharge of pressurized gas from said accumulator, and whereby the gas exiting from said lading clearing opening will tend to clear away lading adjacent said elbow which tends to prevent the same from rotating.

21. Apparatus for assisting in the unloading of a difficult to unload lading comprising: a vessel adapted to contain said lading; an accumulator mounted adjacent said vessel; a first conduit connecting said accumulator with valve means for periodic discharge of said accumulator; a self-indexing elbow mounted on said vessel; a second conduit connecting said valve means with said elbow; said elbow comprising an elbow conduit portion in fluid communication with said second conduit; said elbow conduit portion being rotatably mounted in operative relation to the vessel and extending within the vessel and having a conduit centr line defining an axis about which said elbow is rotatable; said elbow conduit portion having integral therewith an elbow portion having an elbow center line passing therethrough; said elbow center line intersecting said axis and making an angle therebetween within the range of about 45° and 135°; said axis and said elbow center line adjacent their intersection defining an elbow plane; said elbow portion having a discharge end having a discharge opening therein through which said elbow center line passes; said elbow center line at said discharge end making an angle with respect to said plane, and being offset with respect to said axis so as to define a moment arm between the elbow portion and said axis; means for pressurizing said accumulator with gas sufficient to dislodge bridged or clogged lading in the vessel and sufficient to cause said elbow to rotate relative to said axis; a bearing assembly mounted between said elbow conduit portion and at least one of said vessel and said second conduit, said bearing assembly having a frictional force sufficient to limit rotation of said elbow with respect to said vessel, said bearing assembly comprising at least one fixed member mounted integral with said vessel and at least two movable members affixed to the said conduit portion extending at least partially on opposite sides of said fixed member and frictionally engaging said fixed member; a fastener engaging said movable members whereby the frictional force between said fixed and movable members may be varied with said fastener; and check valve means mounted in said discharge and whereby a release of pressurized gas by said valve means from said accumulator will cause said gas to pass through said second conduit into said elbow and discharge from said discharge opening into said vessel with a thrust sufficient to cause said elbow to rotate with respect to said axis, the frictional force in said bearing assembly being sufficient to cause the rotation to cease at a new angular position relative to said axis prior to the next discharge of pressurized gas from said accumulator, and whereby the extent to which said elbow rotates relative to said axis when a blast of gas is discharged therefrom may be varied by adjustment of said fastener, and whereby lading is substantially prevented from entering said elbow by said check valve means.

* * * * *

UNITED STATES PATENT OFFICE
CERTIFICATE OF CORRECTION

PATENT NO. : 3,958,722
DATED : May 25, 1976
INVENTOR(S) : Richard H. Dugge and Dallas W. Rollins It is certified that error appears in the above-identified patent and that said Letters Patent are hereby corrected as shown below:

Column 3, lines 55 and 56, "Appropriate conduits first 16" should read -- Appropriate first conduits 16 --.

Column 5, line 37, "(b 360° per revolution)" should read -- (360° per revolution).--.

Signed and Sealed this

Tenth Day of August 1976

[SEAL]

Attest:

RUTH C. MASON
Attesting Officer

C. MARSHALL DANN
Commissioner of Patents and Trademarks